United States Patent [19]

Bertagni

[11] Patent Number: 5,007,707
[45] Date of Patent: Apr. 16, 1991

[54] INTEGRATED SOUND AND VIDEO SCREEN

[76] Inventor: Jose J. Bertagni, 39 Seabrook Cove, Newport Beach, Calif. 92660

[21] Appl. No.: 428,893
[22] Filed: Oct. 30, 1989
[51] Int. Cl.⁵ .............................................. G03B 21/56
[52] U.S. Cl. ...................................... 350/118; 352/36; 353/79
[58] Field of Search ................... 350/118, 119; 352/36; 353/15, 18, 79

[56] References Cited

U.S. PATENT DOCUMENTS

| | | | |
|---|---|---|---|
| 1,778,084 | 10/1930 | Nevin | 350/118 |
| 1,817,630 | 8/1931 | Kroesen | 350/118 |
| 1,997,815 | 4/1935 | Edelman | 350/118 |
| 2,175,434 | 10/1939 | Hurley | 350/118 |

Primary Examiner—Richard A. Wintercorn
Attorney, Agent, or Firm—Price, Gess & Ubell

[57] ABSTRACT

An array of sound transducers where sound producing groups made up of one or more of the sound transducers may be separately driven so as to spatially reproduce a live performance. Flat sound transducers having sound producing diaphragms with a reflective surface may be employed so that the collective flat sound transducers may provide an image projection surface. The sound producing groups in the array of sound transducers may also be controlled so that the audio tracks the video or the location of a live performer.

25 Claims, 5 Drawing Sheets

FIG. 10
FIG. 12
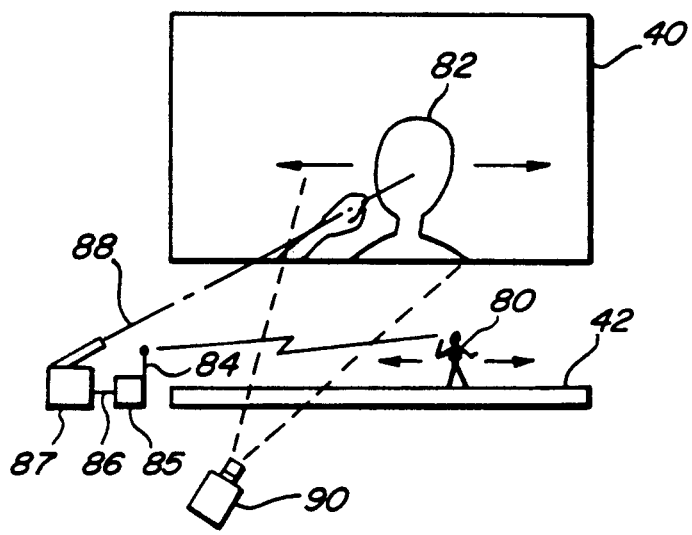
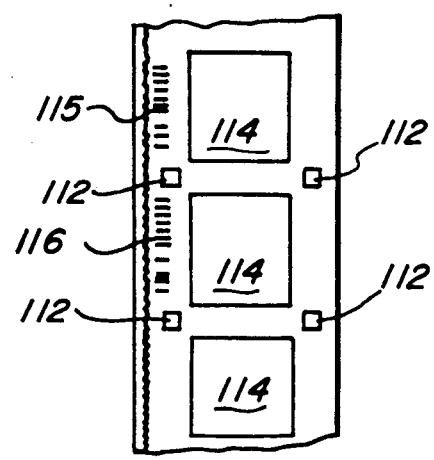
FIG. 11
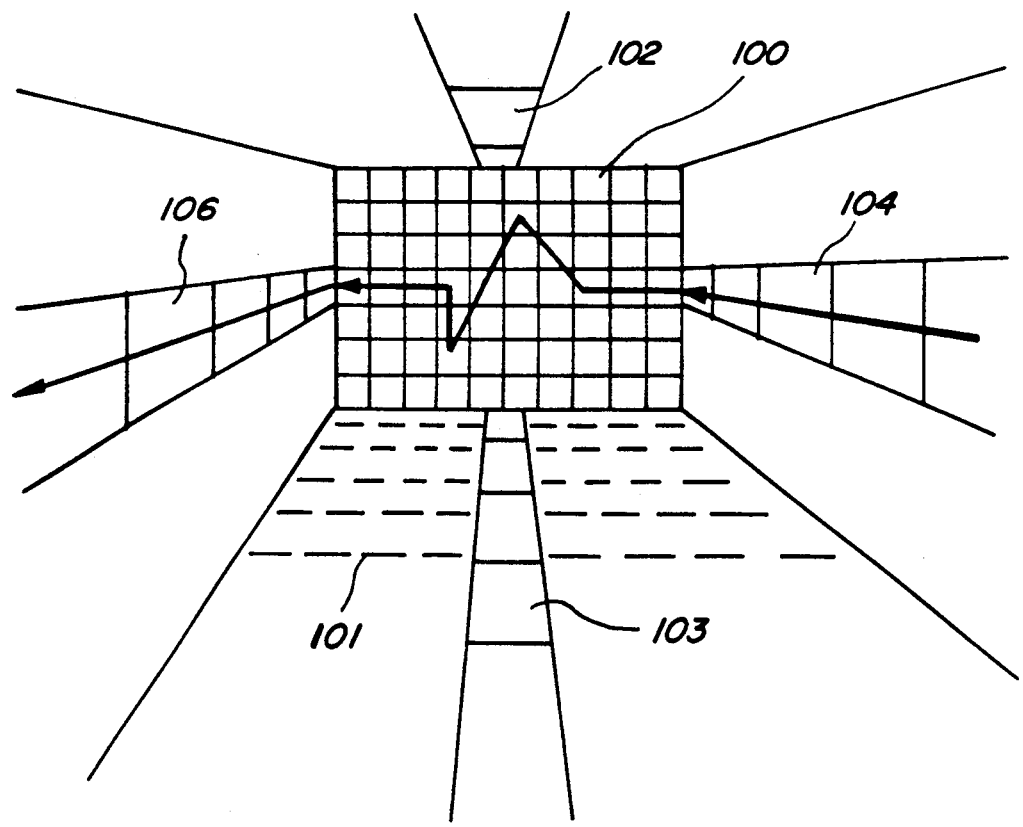

INTEGRATED SOUND AND VIDEO SCREEN

BACKGROUND OF THE INVENTION

1. Field of the Invention

This invention generally relates to a new application for sound transducers. More particularly, the present invention relates to an array of flat sound transducers that provides both an omnidirectional source of sound and a highly reflective surface for projection of an image thereon.

2. Description of the Prior Art

Loud speakers may be found in a variety of settings of various scale, for example, in private homes, supermarkets, meeting rooms, concert halls, and stadiums. The prior art typically uses stereophonic reproduction when it is desirable to achieve an approximation to spatial reality in addition to both power and fidelity.

For example, in an orchestra hall or at a large outdoor concert, two powerful groups of conical speakers are usually located on either side of the performers and the stage. There are a number of problems with such an arrangement.

First, stereophonic reproduction provides a poor spatial approximation to the actual performance. The underlying goal of sound reproduction is to provide the listener with an amplified version of the performance that replicates, as nearly as possible, the musical sounds that would be heard were the listener to be located centrally in front of the stage and near enough to hear the music live from the instruments. Stereophonic reproduction falls short of this goal because by its very nature a listener is looking ahead at the performance but hearing the musical sound from either side of the stage.

Second, ordinary conical speakers are usually used in stereophonic reproduction. Because the dispersion pattern of a conical speaker is not omnidirectional but rather relatively narrow and directional (narrowing even further in proportion to frequency), listeners that are offset from the center will not hear a faithful reproduction of the live performance. In order to compensate for the relatively narrow dispersion pattern of conical speakers, the audience must extend away from the stage in a narrow lengthwise fashion in order to ensure that most listeners will be within the overlapping dispersion patterns of the two stereophonic speaker groups.

A third problem arises as a result of attempting to provide the farthest listeners with adequate volume levels. Because the power output of the speakers must be very high to reach those listeners at the rear of the lengthwise audience, listeners that are near the front are typically subject to extremely high and often painful volume levels.

A fourth problem arises in those applications where it is undesirable to have exposed speakers A good example of such an application is where the audience is also being provided with a projected visual image in addition to the audio. Such applications would for example be a movie theater or a projection screen in a meeting room. Just as with a live performers in an orchestra hall or concert situation, it is preferred to approximate spatial reality by having the audio emanate from the projected image that the viewers are observing rather than from the sides.

There are two readily apparent possibilities when attempting to hide the speakers that are being used in conjunction with a projected video image: (i) the speakers may be placed on either side of the projection screen behind screens; or (ii) the speakers may be placed behind the projection screen itself.

The first alternative is undesirable because the source of the sound is not identical with the visual image.

The second alternative has been accomplished in a number of movie theaters, although not satisfactorily so, by placing a limited array of speakers (a main central channel and two side channels) behind a perforated plastic screen. The perforations are necessary in order to allow an adequate portion of the energy being transmitted to the atmospheric molecules to pass through the screen. Such screened systems are inadequate because the perforated screen tends to limit the high frequency response of the speakers Moreover, because the perforated screen must also serve as the projection screen, the definition of the image and the percentage of reflected light is undesirably reduced. This unavoidable reduction in reflective efficiency is particularly problematic where the image is being projected under ambient light conditions.

As will be explained further herein, flat loud speakers are a desirable alternative to conical speakers Prior art flat loud speakers typically include a diaphragm that is constructed from a substantially planar panel of molded styrofoam or other suitable material The diaphragm is usually suspended from a support frame by a layer of foam rubber or the like. The front side of the diaphragm is generally smooth while the back side or frame side of the diaphragm has various shapes and channels molded therein so as to divide the panel into a plurality of regions, each region being suited for reproduction of sound in a particular frequency range. A plurality of cross members are attached to the support frame and at least one electromagnetic driver is attached thereto so that its electromagnetic coil is situated above a corresponding hammer that is attached to a predetermined region on the back side of the diaphragm.

Typical prior art flat loud speakers, methods of manufacturing the same, and components thereof are disclosed in the following prior U.S. Pat. Nos. issued to the herein inventor: 4,257,325; 4,184,563; 4,003,449; 3,801,943; 3,792,394; 3,779,336; 3,767,005; 3,722,617; and 3,596,733. The foregoing patents are hereby incorporated by reference as if fully set forth herein.

SUMMARY OF THE INVENTION

It is an object of the present invention to provide a speaker array that has an omnidirectional sound dispersion pattern;

It is a further object of the present invention to provide a sound transducer system that closely approximates spatial reality;

It is a further object of the present invention to provide a speaker array that can double as a projection screen;

It is a further object of the present invention to provide a speaker array that can double as a projection screen without need for a perforated screen in front of the speaker array;

The present invention achieves the above objects by providing a sound transducer system comprising a plurality of sound transducers arranged adjacent to one another so as to form a grid where the grid is subdivided into a plurality of separately addressable sound producing regions, each sound producing region consisting of at least one sound transducer. In a further embodiment, the sound transducers may be flat and have a reflective surface such that the sound transducer system may also serve as a projection screen.

BRIEF DESCRIPTION OF THE DRAWINGS

FIG. 10 is a schematic view of a fourth embodiment of an integrated sound and video screen according to the present invention wherein both video and audio track the position of a performer on stage;

FIG. 11 is a perspective view of a fifth embodiment of the present invention as used in a movie theater;

FIG. 12 is a top view of a modified film strip for use with the embodiment of FIG. 11;

DETAILED DESCRIPTION OF THE PREFERRED EMBODIMENT

The following description is provided to enable any person skilled in the art of sound transducers to make and use the invention and sets forth the best mode contemplated by the inventor for carrying out the invention. However, various modifications will remain readily apparent to those skilled in these arts, since the generic principles of the present invention have been defined herein specifically to provide an integrated sound and video screen that is both economical and practical.

A basic goal of flat loud speakers is to closely approximate reality by providing a unitary omnidirectional source of sound independent of frequency. While the present invention may be practiced with conical speakers, flat loud speakers are generally desirable over conical speakers because the transfer of energy from a flat diaphragm to the air is substantially omnidirectional.

Figure 1:
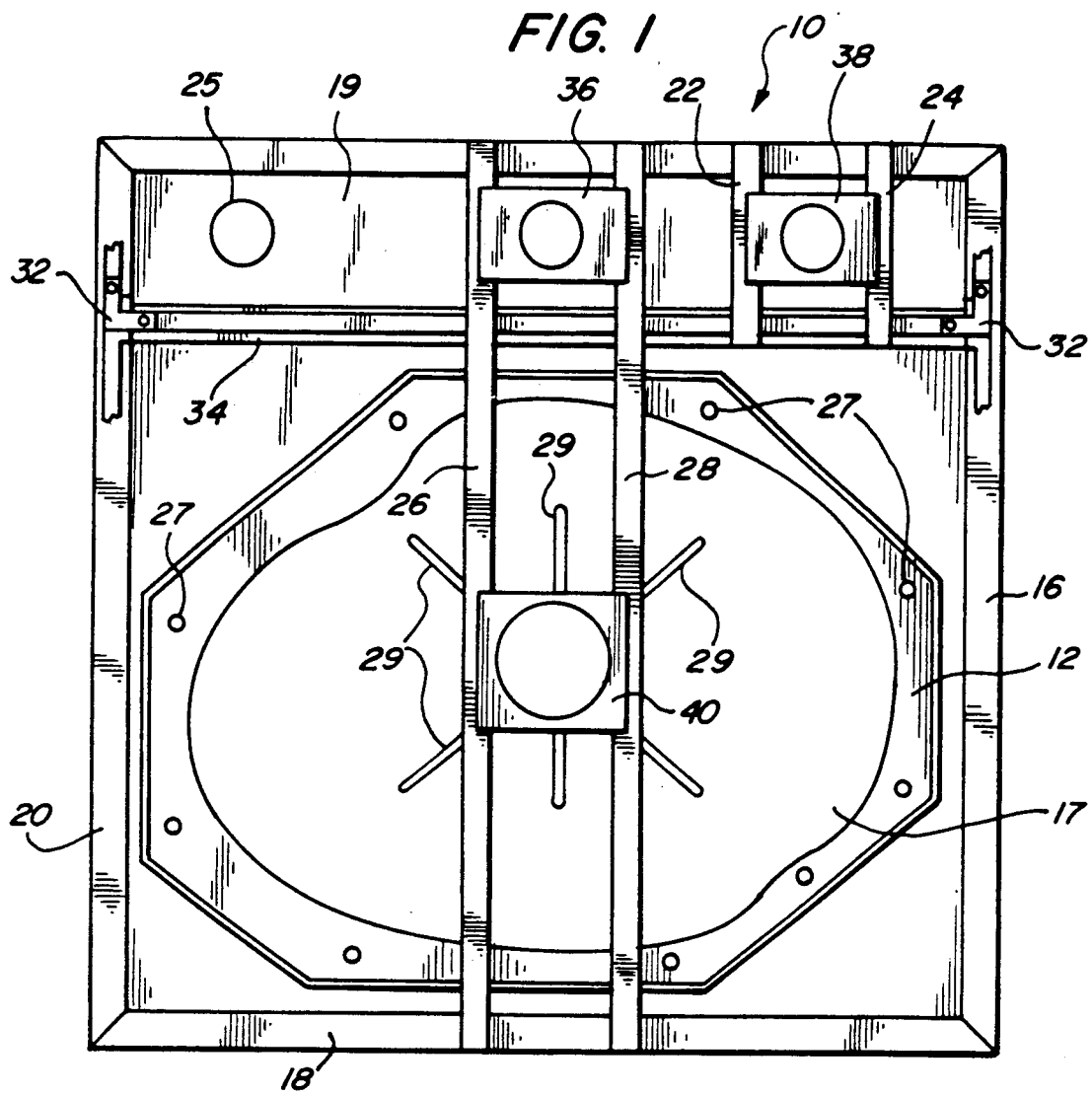
FIG. 1 is an overhead plan view of the back side of a first embodiment of a frame of a flat sound transducer that is used in the present invention.
Figure 2:
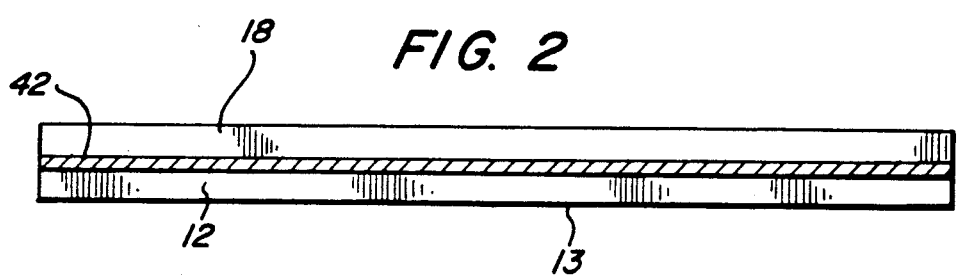
FIG. 2 is a side plan view of the flat sound transducer of FIG. 1.

With reference to FIGS. 1 and 2, it can readily be seen that a flat loud speaker according to the present invention is comprised of a flat diaphragm 12 that is movably suspended by a cushioning strip 42 from frame members 14, 16, 18, and 20. In a preferred embodiment, the frame members 14, 16, 18, 20 are aluminum and the cushioning strip 42 is foam rubber. The planar diaphragm 12 has a substantially flat front surface 13 and a back surface whereupon various sound reproduction regions 17, 19 are defined.

As shown in FIG. 1, an irregular shaped low frequency region 17 is defined by an endless channel 50 and a rectangular high frequency region 19 is defined by three frame members 14, 16, 20 and cross member 34. The frequency response of the low frequency region may be adjusted by inserting additional mass (such as ball bearings or the like) into holes 27 that are provided about the perimeter of the low frequency region. Slots 29 are included for the purpose of providing additional flexibility to the low frequency region.

In order to reproduce sound based on electrical signals, the flat loud speaker 10 further comprises two electromagnetic drivers 36, 40. The low frequency electromagnetic driver 40 is supported over the low frequency region 17 by a pair of cross members 26, 28. The high frequency electromagnetic driver 36 is beneficially supported over a subregion of the high frequency region 19 by the same pair of cross members 26, 28. As shown in FIG. 1, one or more additional electromagnetic drivers 38 (only one additional driver is shown) may be provided to drive other subregions of varying frequency response in the high frequency region 19. Such additional drivers would likely have different masses in order to assist in providing the desired frequency response For example, a piezo-electric driver may be employed to assist in the reproduction of very high frequency signals.

A cross member 34 is provided between the two outer member 16, 20 with fasteners 32. The actual fastening method used may of course differ from that depicted in FIG. 1. Cross member 34 is used in conjunction with a dampening strip (not shown) that is sandwiched between the crossmember 34 and the planar diaphragm 12 so that the detrimental low frequency vibrations are prevented from travelling from the low frequency region 17 into the high frequency region 19 while the high frequency vibrations are permitted to travel from the high frequency region 19 into the low frequency region 17.

The diaphragms of flat sound transducers are generally manufactured from a reflective material such as, for example, white blown polystyrene foam. Hence, the diaphragm of a flat sound transducer may double as an image projection surface.

The size of the projection surface can be varied by adjoining a plurality of flat sound transducers to one another in an array or grid-like fashion.

Figure 3:
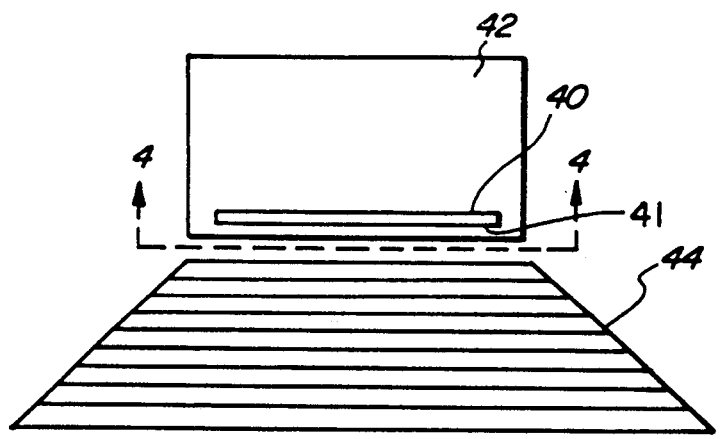
FIG. 3 is an overhead view of first embodiment of the present invention/where a large grid of flat sound transducers is employed above a performance stage.

In a first embodiment, a large area projection screen and high power audio source may be fabricated by adjoining a large number of flat sound transducers to one another so as to form a large-scale integrated sound and video screen. FIG. 3 is an overhead plan view of an application of such a large-scale grid 40. A typical largescale grid 40 might be constructed from 200 flat sound transducers. Whereas one typical flat sound transducer 10 is capable of delivering over 100 watts of power, the largescale grid 40 is capable of delivering over 20,000 watts of audio power.

Figure 4:
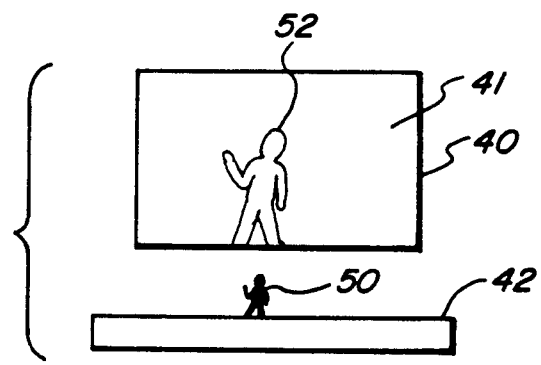
FIG. 4 is an elevational plan view of the performance stage and the sound transducer grid of FIG. 3 taken along lines 4—4.

In FIG. 3, the large-scale grid 40 is supported above a performance stage 42 by a frame structure (not shown). The seats occupied by the viewer/listeners are designated with descriptor 44. FIG. 4 is a front elevational view of the of the stage 42 and large-scale grid 40 as seen when viewed along lines 4—4 of FIG. 3.

As shown in FIG. 4, the large-scale grid 40 is located centrally above the performers on the stage 42. As a result of the omnidirectional characteristics of the flat sound transducers 10 that make up the grid 40, each individual listener in the audience 44 is provided with audio energy that physically emanates from near the source that the listener visually expects rather than from the sides as with stereophonic speaker towers.

Note that the grid 40 beneficially provides a flat, white surface 41 on which a powerful professional projector may be used to produce an image. As shown in FIG. 4, an image 52 of one or more of the performers 50 can be projected onto the surface 41 of the grid 40. Where there is only a single performer, only one camera will be needed. However, several cameras and a video control unit may be used to track a plurality of performers. As such projection systems are well known in the art, a detailed description will not be included.

Figure 5:
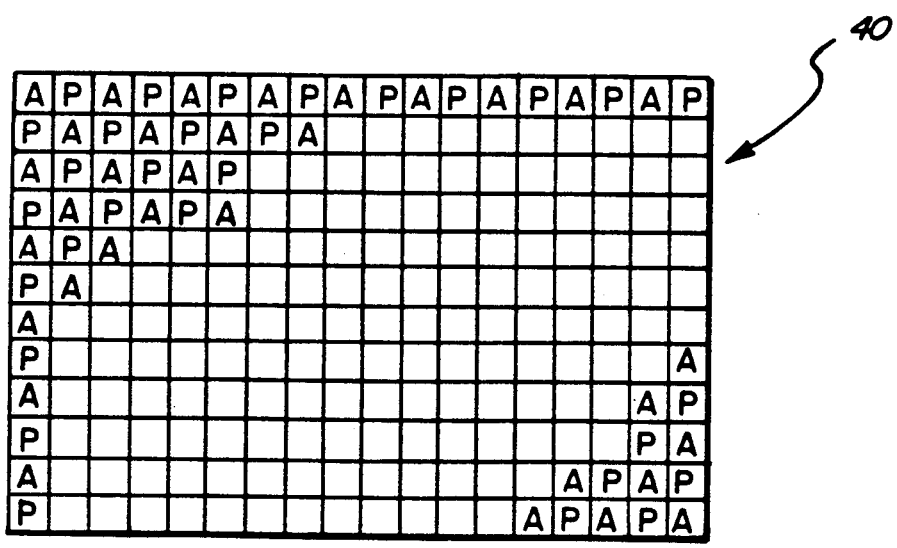
FIG. 5 is a detailed view of the integrated sound and video screen of FIGS. 3 and 4.

FIG. 5 illustrates in more detail the large-scale grid 40. In particular, FIG. 5 illustrates the separate sound transducers (not separately numbered) that make up the grid 40. While the seams between the individual units may be visible at an extremely close distance and with no image being projected on the surfaces 13 of the transducers 10, they become virtually invisible under typical projection environments, to wit: in the dark at night and where the listener/viewers are relatively distant from the grid 40. Hence, there is beneficially no need to cover the sound transducer grid 40 with a reflective screen.

It is a significant advantage that the transducers, flat diaphragms 12 may themselves be used as the reflective surface 41. While the present invention may be practiced with ordinary conical speakers, such speakers would have to be covered with a porous screen in order to hide them and provide a reflective surface. Not only would screening a large grid amount to a difficult and costly endeavor, the reflective efficiency of the screen material must be necessarily diminished in order to allow adequate passage of the audio energy generated by the conical speakers.

In some circumstances, a screen of a particular size may require more transducers than needed to deliver the desired audio output. Under such circumstances, the grid may be created with some sound transducers and some filler or dummy panels. This concept is illustrated in FIG. 5 where an operable transducer unit is identified with the designator "A" (Active) and where a filler or dummy unit is identified with the designator "P" (Passive). In a preferred embodiment, the Active panels and the Passive panels would make up a checker board like patter such that the audio output is proportionally delivered from the grid 40. Under ordinary circumstances, the Passive panels would consist of a flat sound transducer as shown in FIGS. 1 and 2 but without the usual electromagnetic drivers 36, 38, 40.

Figure 6:
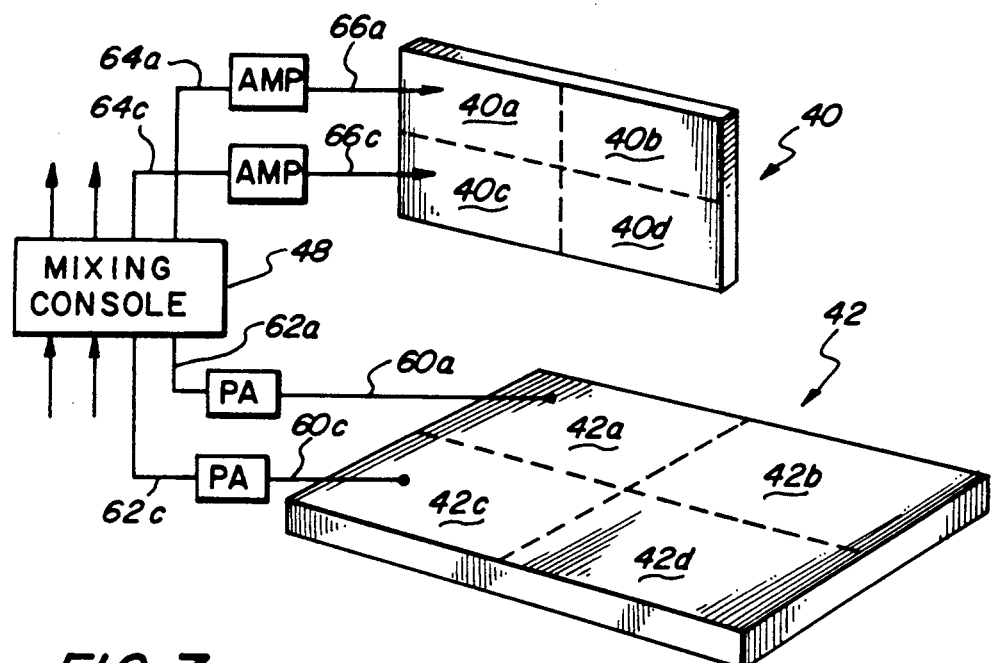
FIG. 6 is a schematic diagram of a second embodiment where a grid of flat sound transducers according to the present invention is subdivided into a plurality of sound producing regions that are driven by a plurality of microphones placed in corresponding regions on a performance stage.

FIG. 6 illustrates a second embodiment of the present invention. In this second embodiment, the spatial relationship between performers (instrument families, etc...) on the stage is replicated by the sound transducers that make up the grid 40. The spatial relationship of performers on the stage is preserved by subdividing the grid 40 into a plurality of separately addressable sound producing regions 40a, 40b, 40c, 40d. While four such sound producing regions are illustrated, there could of course be less or more. A sound producing region could be comprised of anywhere from a single sound transducer to the entire grid 40. The stage 42 is itself subdivided into regions 42a, 42b, 42c, 42d that correspond to the similarly designated sound producing regions on the grid 40.

To further illustrate the invention, it will be assumed that an orchestra is performing on the stage 42. In very rough terms, the violin family would occupy the subregion 42c and the piano would be located in subregion 42a. A microphone 57a, 57c is located in each subregion 42a, 42c. The low amplitude signals produced by the microphones 57a, 57c are provided on transmission lines 60a, 60c to respective preliminary amplifiers (PA) and then on transmission lines 62a, 62c to a mixing console 48. The frequency adjusted signals are output from the mixing console 48 on lines 64a, 64c to amplifiers (AMP) after which the signals are delivered to the respective sound producing regions 40a, 40c on lines 66a, 66c.

Under this arrangement, the spatial relationship between the live source of sounds (i.e. the instrument families) is maintained by subdividing the grid 40 into as many sound producing regions as desired. Thus, the listeners are provided with an amplified performance that closely approximates what a listener would hear were he/she close enough to the orchestra to hear the instruments without need for audio amplification. A listener hearing an unamplified live performance would perceive not only location (left to right) but also distance (in the form of wave fronts). The herein invention maintains the spatial arrangement with respect to location and further simulates the perception of distance by outputting sounds that are produced in the regions that are physically further back on the stage 42 (e.g. 42a and 42b) higher up on the grid 40 (eg 40a and 40b). It is contemplated that the distal relationship of performers may also be simulated in the amplified audio by including a delay factor in the amplification of the rearward regions (e.g. 42a and 42b).

Figure 7:
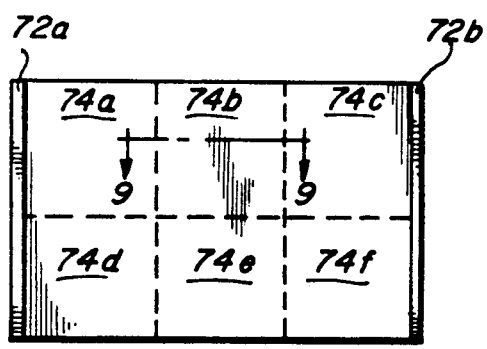
FIG. 7 is a front elevational view of a third embodiment of the present invention consisting of a small 2×3 grid of flat sound transducers for use in a proximate situations such as a meeting room.

A third embodiment of the invention involves an a small-scale integrated sound and video screen that is designed for use in a more proximate setting such as a projection screen in a board room. FIG. 7 illustrates such a small-scale grid 70 where such a grid is comprised of six sound transducer 74a-74f (comparable to that illustrated in FIGS. 1 and 2) that are adjoined to one another so as to form a 2×3 rectangular grid.

Such a grid 70 could be mounted on a wall in a meeting room in order to enhance video presentations by providing an audio source that is coincident with the video image being viewed. Because the viewers would be much closer to the grid 70 (as compared with a large-scale grid 40 used at a concert), it may be desirable to place a white plastic screen 76 or other sheet of reflective material over the grid 70. Even at this relatively small scale, the movement of the transducer diaphragms when driven by an audio signal is very small in relation to the distance between a projector and the grid 70. Hence, even when moving, the transducer diaphragms will remain within the focus of the projector so that the movement will not be visually perceptible to the viewer.

Note that because the grid 70 is comprised of flat sound transducers 74a-74f (as opposed to conical speakers), the plastic screen 76 does not have to be perforated. The plastic screen 76 is arranged between columns 72a and 72b such that the screen 76 lightly touches the surfaces 13 (FIG. 1) of the sound transducers 74a–74f. The key to successful operation it to ensure that the screen 76 is pulled into contact with the diaphragms so that little air (which would dampen the transfer of audio energy) is present between the diaphragms and the screen, but not so tight that movement of the diaphragms is hindered. In essence, it is desired that the screen 76 act as a flexible skin with respect to the movement of the transducer diaphragms.

Figure 9:
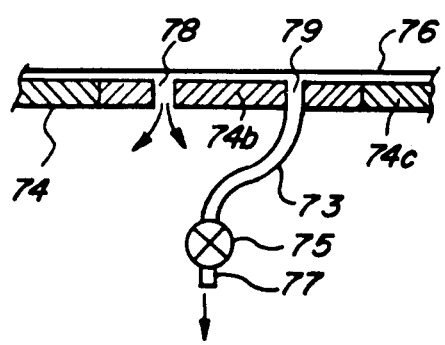
FIG. 9 is a partial cross-sectional view of the flat sound transducers making up the grid of FIG. 7 taken along lines 9—9.
Figure 8:
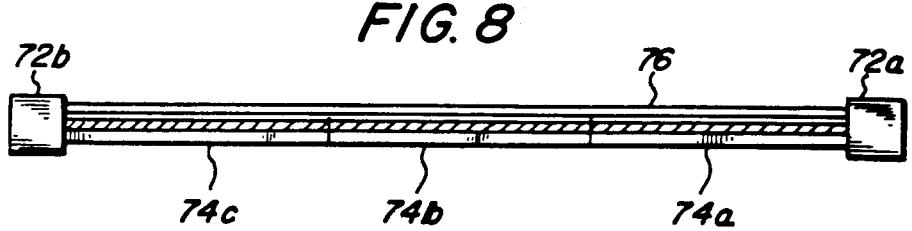
FIG. 8 is a top plan view of the grid of FIG. 7 showing the use of a nonporous reflective screen.

Referring to FIG. 9, it can be seen that one or more air passages 78, 79 may be provided through the sound transducer diaphragms 12 (FIG. 1) in order to assist in maintaining a tight relationship between the diaphragms of the transducers 74a–74f and the screen 76. The air passages may be used in one of two possible modes. In a passive mode, the air passages 78, 79 would provide an escape path for any air that would otherwise be trapped between the transducer diaphragms and the screen 76. In a second mode, a positive bond could be accomplished rather than simply providing an escape path for trapped air. As shown in FIG. 9, a vacuum pump 75 could be coupled to one or more of the air passages 79 such that any air between the transducer diaphragms 12 and the screen 76 could be removed and ejected out exhaust 77.

FIG. 10 illustrates a fourth embodiment of the present invention where the image of a performer 80 is projected onto the large-scale integrated sound and video screen 40 with projector 90. As the performer 80 moves about the stage 42, his position is tracked with spotlights as well as by the camera (not shown) that is feeding the projector 90. In this embodiment, it is desired to vary which sound transducers are delivering audio as a function of the performers position The performers 80 position on the stage 42 can be obtained by any number of methods such as by triangulation based on the position and direction of the spotlights and/or the camera or, alternatively, with a portable transponder.

The actual method of controlling the individual sound transducers may vary. One possible method involves the use of having separate amplifier located on each of the sound transducers that makes up the grid 40. Each sound transducer would further include an IR or FM pickup (not shown) so that the audio signal can be transmitted to the desired transducer without need for providing a separate hard-wired signal path to each individual sound transducer. Moreover, by using an individual amplifier on each transducer along with an IR pickup (or similar device), the only hardwiring that needs to be provided is a single power line that may be jumped from one transducer to another Where the frames of the transducers are metallic, the return side of the power may achieved by grounding the entire frame structure. In order to substantially reduce the weight of the individual sound transducers and of the overall grid 40, it would be best if the individual amplifiers did not include a heavy transformer. Instead, AC could be converted to DC off of the grid and the DC power could then be provided to the individual amplification circuits using the above (or similar) power distribution system.

The performer 80 would use a wireless microphone that transmits the performers voice (audio) to receiver 85 via antenna 84. The audio is then output on line 86 to a laser feed or IR device 87 for transmission to the appropriate sound transducer or transducers on the grid 40, with direction of the IR feed 88 being varied as a function of the position data.

A fifth embodiment for use in a movie theater or the like is illustrated by FIG. 11. Here a movie screen is comprised of an integrated sound and video screen 100 where each of the sound transducers making up the screen 100 is separately addressable. The system may further include wall units 104, 106 and/or a ceiling unit 102, each of the sound transducers in these units alSo being separately addressable.

FIG. 12 illustrates a typical strip of film 110 that has been modified to control the system shown in FIG. 10. The film strip 110 is comprised of a plurality of video frames 114, a plurality of holes 112 so that the film may be driven with a sprocket, and an audio track 115. In order to control the transducers of the video screen 100 or the wall, floor, or ceiling units 104, 106, 102, 103 it is necessary to also provide position data on the film strip 110. A preferred method of providing position data is to encode such data in a bar code format 116 and to place such information between the sprocket holes 112 of the film strip 110. The audio track 115, rather than containing single channel audio signals, would be used to provide a synchronization signal to a separate multi-channel playback device. In this manner, the audio that accompanies a film can be provided on several channels and the several audio tracks can be simultaneously varied in position on the screen in relation to the actual images being viewed by the audience 101.

The solid arrow line in FIG. 11 is provided in order to help express this embodiment. For example, if the film included a scene where a motorcycle were approaching from the right, the sound would be made to travel along wall strip 104, the sound of the motorcycle would then track the image of the motorcycle when it appeared on the screen 100, and finally, the sound of the motorcycle would be caused to travel along wall strip 106.

Figure 13:
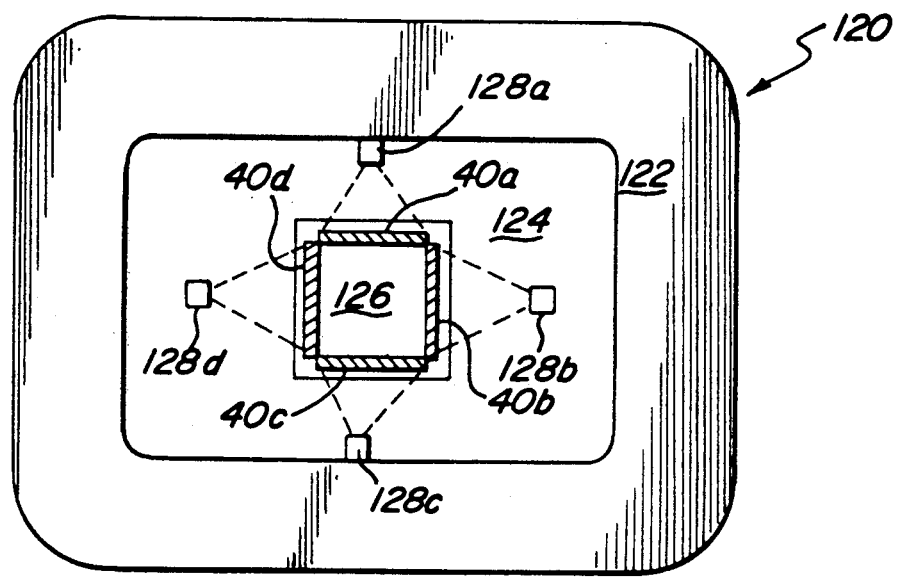
FIG. 13 is a top plan view of a sixth embodiment of the present invention as used in an arena that is encircled by seats.

FIG. 13 illustrates a sixth embodiment of the present invention as used in a large arena 120 having seating 122 that wraps around a central playing field 124. When such an arena 120 is used for a live musical performance, it is ordinarily necessary to place the performance stage at one end or in one corner of the arena 120. However, under such conditions, much of the seating must go unused because listeners would be unable to satisfactorily see the performers from extreme angles or from behind the performance stage.

As shown in FIG. 13, the present invention allows the performance stage 126 to be placed in the center of the central playing field 124. A plurality of integrated sound and video screens 40a–40d are supported above and around the performance stage 126. The screens 40a–40d are of the same type disclosed with reference to FIG. 5. By using projectors 128a–128c to project a live image of the performance onto the respective screens 40a–40d, an excellent view is possible from nearly all of the seats 122 in the arena 120. Note that it is possible to include multiple cameras and a video control system so that a desirable front view could be projected on all of the screens independent of the performer's orientation and even as the performer moves about the stage 126.

Figure 14:
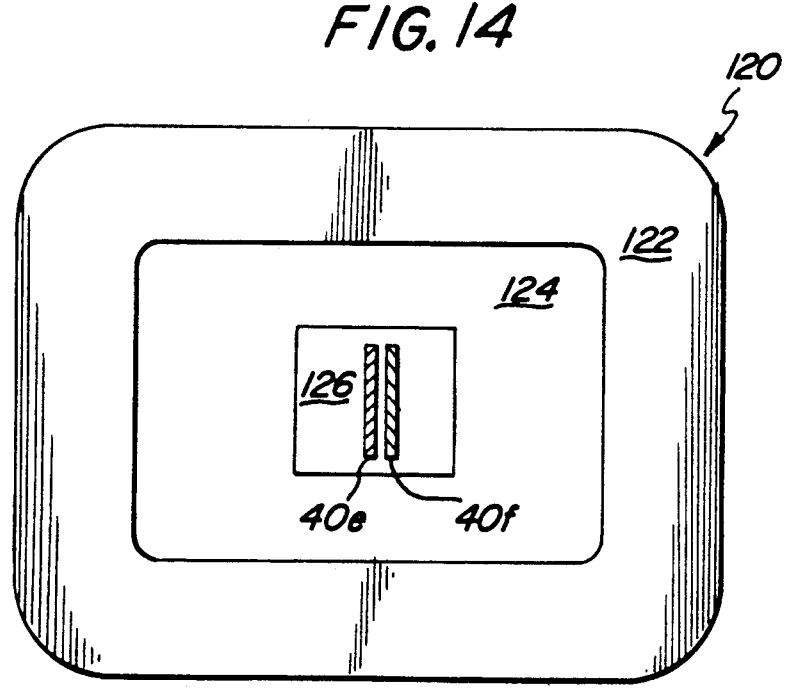
FIG. 14 is a top plan view of a seventh embodiment of the present invention with two grids in a push-pull arrangement.

A seventh embodiment also suitable for use in an open arena 120 is illustrated by FIG. 14 where two grids 40e, 40f are arranged back-to-back so as to achieve a push-pull coupling effect. Such an arrangement is beneficial because it reduces distortion, enhances efficiency and provides a higher output gains for a given audio signal.

While the above features of the present invention teach specific applications for an integrated sound and video screen, it can be readily appreciated that it would be possible to deviate from the above embodiments of the present invention and, as will be readily understood by those skilled in the art, the invention is capable of many modifications and improvements within the scope thereof. Accordingly, it will be understood that the invention is not limited by the specific embodiments but only by the spirit and scope of the appended claims.

What is claimed is:

1. A sound transducer comprising:
   a plurality of sound transducers arranged adjacent to one another so as to form a grid pattern wherein the sound transducers are flat sound transducers, each of said flat sound transducers having a substantially flat sound producing diaphragm with substantially omnidirectonal sound dispersion characteristics and wherein the flat diaphragms of the flat sound transducers have a reflective surface such that the sound transducer system may serve as a projection screen;
   the grid pattern being formed by the sound transducers being divided into a plurality of separately addressable sound producing regions where a sound producing region includes at least one sound transducer; and
   control means for controlling the separately addressable sound producing regions such that the sound produced by the sound transducers may be controlled in conjunction with a video image that is being projected on the projection screen.

2. An integrated sound and video system comprising:
   a plurality of sound transducers, each sound transducer having a sound producing flat diaphragm with a reflective surface and at least one driver for driving the diaphragm in response to an audio signal, the sound transducers being arranged adjacent to one another so as to form a grid pattern, the reflective surfaces of the flat diaphragms providing a collective reflective imaging surface, the sound transducers that form the grid pattern being divided into a plurality of separately addressable sound producing regions where a sound producing region includes at least one sound transducer;
   means for projecting an image onto the reflective imaging surface;
   means responsive to the location of the projected image for generating a location signal that represents the position of the image that is being projected onto the reflective imaging surface;
   means for providing the audio signal;
   means for directing the audio signal to a sound producing region in response to the location signal such that the plurality of sound producing regions may provide an audio output that moves in conjunction with the image that is being projected onto the reflective imaging surface.

3. The integrated sound and video system of claim 2 further comprising a plurality of additional sound transducers, the additional sound transducers being located so as to surround a person that is viewing an image projected onto the reflective imaging surface.

4. The integrated sound and video system of claim 3 wherein the reflective imaging surface is located at the rear inside wall of a movie theater and the additional sound transducers extend linearly adjacent to one another from the reflective imaging surface along the two side walls, floor, and ceiling of the movie theater.

5. The integrated sound and video system of claim 2 wherein the means for projecting the image includes a film projector and film and the means for generating a location signal includes an encoded data being recorded on the film and a means located in the film projector for reading the encoded data.

6. The integrated sound and video system of claim 3 wherein the encoded data recorded on the film is a bar code.

7. The integrated sound and video system of claim 2 wherein each of the sound transducers includes an integral amplifier and a receiving means for receiving an audio signal from the means for directing the audio signal.

8. The integrated sound and video system of claim 7 wherein the means for directing the audio signal is an IR beam and the means for receiving an audio signal is an IR receiver.

9. An integrated sound and video system comprising a plurality of sound transducers, each sound transducer having a sound producing substantially flat diaphragm with a reflective surface and at least one driver for driving the diaphragm in response to an audio signal, the sound transducers being arranged adjacent to one another so as to form a grid pattern, the reflective surfaces of the flat diaphragms providing a collective reflective imaging surface.

10. The integrated sound and video system of claim 9 wherein the sound transducers that form the grid pattern are divided into a plurality of separately addressable sound producing regions where a sound producing region includes at least one sound transducer and further comprising:
    means for projecting an image onto the reflective imaging surface;
    means responsive to the location of the projected image for generating a location signal that represents the position of the image that is being projected onto the reflective imaging surface;
    means for providing the audio signal;
    means for directing the audio signal to a sound producing region in response to the location signal such that the plurality of sound producing regions may provide an audio output that moves in conjunction with the image that is being projected onto the reflective imaging surface.

11. The integrated sound and video system of claim 10 further comprising a plurality of additional sound transducers, the additional sound transducers being located so as to surround a person that is viewing an image projected onto the reflective imaging surface.

12. The integrated sound and video system of claim 11 wherein the reflective imaging surface is located at the rear inside wall of a movie theater and the additional sound transducers extend linearly adjacent to one another from the reflective imaging surface along the two side walls, floor, and ceiling of the movie theater.

13. The integrated sound and video system of claim 10 wherein the means for projecting the image includes a film projector and film and the means for generating a location signal includes an encoded data being recorded on the film and a means located in the film projector for reading the encoded data.

14. The integrated sound and video system of claim 11 wherein the encoded data recorded on the film is a bar code.

15. The integrated sound and video system of claim 10 wherein each of the sound transducers includes an integral amplifier and a receiving means for receiving an audio signal from the means for directing the audio signal.

16. The integrated sound and video system of claim 15 wherein the means for directing the audio signal is an IR beam and the means for receiving an audio signal is an IR receiver.

17. The integrated sound and video system of claim 9 further comprising a nonporous reflective screen being supported in front of and immediately adjacent to the diaphragms of the sound transducers so that the nonporous reflective screen is placed in light positive contact with the diaphragms in order to provide an improved reflective imaging surface by covering the seams between the diaphragms of the sound transducers that form the grid pattern.

18. The integrated sound and video system of claim 17 wherein each of the diaphragms has at least one transverse aperture for providing an escape path for any air that may be trapped between the nonporous reflective screen and the diaphragms.

19. The integrated sound and video system of claim 18 further comprising a vacuum means for positively evacuating any air that may be trapped between the nonporous reflective screen and the diaphragms.

20. A combination sound/image screen comprising:
a plurality of sound transducers, each sound transducer having a flat diaphragm that is made of a reflective material and that will emanate sound when driven by a driver and a signal source;
the sound transducers being arranged adjacent to one another so that the sound transducers and their respective flat diaphragms form a planar grid, the flat diaphragms of the sound transducers that make up the grid providing an integral source of sound and a reflective imaging surface.

21. The combination sound/image screen of claim 20 wherein the planar grid is comprised of a plurality of sound producing region, a sound producing region consisting of at least one sound transducer.

22. The combination sound/image screen of claim 20 wherein the grid is rectangular.

23. The combination sound/image screen of claim 22 wherein the planar grid is additionally comprised of a plurality of reflective filler panels, the reflective filler panels being interspersed with the flat diaphragms of the sound transducers.

24. The combination sound/image screen of claim 23 wherein each of the reflective filler panels is comprised of a flat diaphragm.

25. The combination sound/image screen of claim 23 wherein the plurality of flat diaphragms and the plurality of filler panels are interspersed among one another so as to form a checker board pattern whereby the number of sound transducers necessary for providing a grid of a certain size may be minimized while retaining a proportional source of sound from the sound transducers that comprise the various sound producing regions of the planar grid.

* * * * *